(12) United States Patent
Anderson et al.

(10) Patent No.: US 7,246,001 B2
(45) Date of Patent: Jul. 17, 2007

(54) METHOD FOR CONTROLLING THE GROUND SPEED OF A WORK MACHINE

(75) Inventors: Michael D. Anderson, East Peoria, IL (US); Michael D. Betz, Knoxville, IL (US); Douglas A. Carlson, Morton, IL (US); Stephen C. Garnett, Princeville, IL (US)

(73) Assignee: Caterpillar Inc, Peoria, IL (US)

( * ) Notice: Subject to any disclaimer, the term of this patent is extended or adjusted under 35 U.S.C. 154(b) by 574 days.

(21) Appl. No.: 10/737,004

(22) Filed: Dec. 16, 2003

(65) Prior Publication Data

US 2005/0131611 A1 Jun. 16, 2005

(51) Int. Cl.
*B60K 31/04* (2006.01)
(52) U.S. Cl. .................. 701/93; 701/50; 180/179
(58) Field of Classification Search ............ 701/50, 701/54, 93; 180/170, 176, 179; 123/350, 123/352
See application file for complete search history.

(56) References Cited

U.S. PATENT DOCUMENTS

| | | | |
|---|---|---|---|
| 3,866,580 A | 2/1975 | Whitehurst et al. | |
| 4,102,131 A | 7/1978 | Reynolds et al. | |
| 4,232,572 A | 11/1980 | Ross et al. | |
| 4,353,272 A | 10/1982 | Schneider et al. | |
| 5,088,043 A * | 2/1992 | Akishino et al. | 701/93 |
| 5,525,043 A | 6/1996 | Lukich | |
| 5,720,358 A * | 2/1998 | Christensen et al. | 180/53.4 |
| 6,078,859 A * | 6/2000 | Jastrzebski et al. | 701/93 |
| 6,115,661 A | 9/2000 | Hosseini et al. | |
| 6,178,371 B1 * | 1/2001 | Light et al. | 701/93 |
| 6,234,254 B1 * | 5/2001 | Dietz et al. | 172/3 |
| 6,240,356 B1 | 5/2001 | Lapke | |
| 2005/0004736 A1 * | 1/2005 | Belcher et al. | 701/50 |

* cited by examiner

*Primary Examiner*—Gary Chin
(74) *Attorney, Agent, or Firm*—Jeff A. Greene; Finnegan, Henderson, Farabow, Garrett & Dunner

(57) ABSTRACT

A method of maintaining a constant ground speed of a work machine having an engine, powertrain, and at least one electronic control module (ECM) is disclosed. The method included sensing a parameter indicative of the ground speed of the work machine and responsively producing a signal indicative of the actual ground speed, providing a predetermined maximum ground speed of the work machine, receiving the signal indicative of the actual ground speed and the predetermined maximum ground speed of the work machine by the ECM, applying an algorithm to determine the desirable RPM of the engine of the work machine, and modulating the engine RPMs to the desirable engine RPMs to maintain a constant ground speed of the work machine.

10 Claims, 5 Drawing Sheets

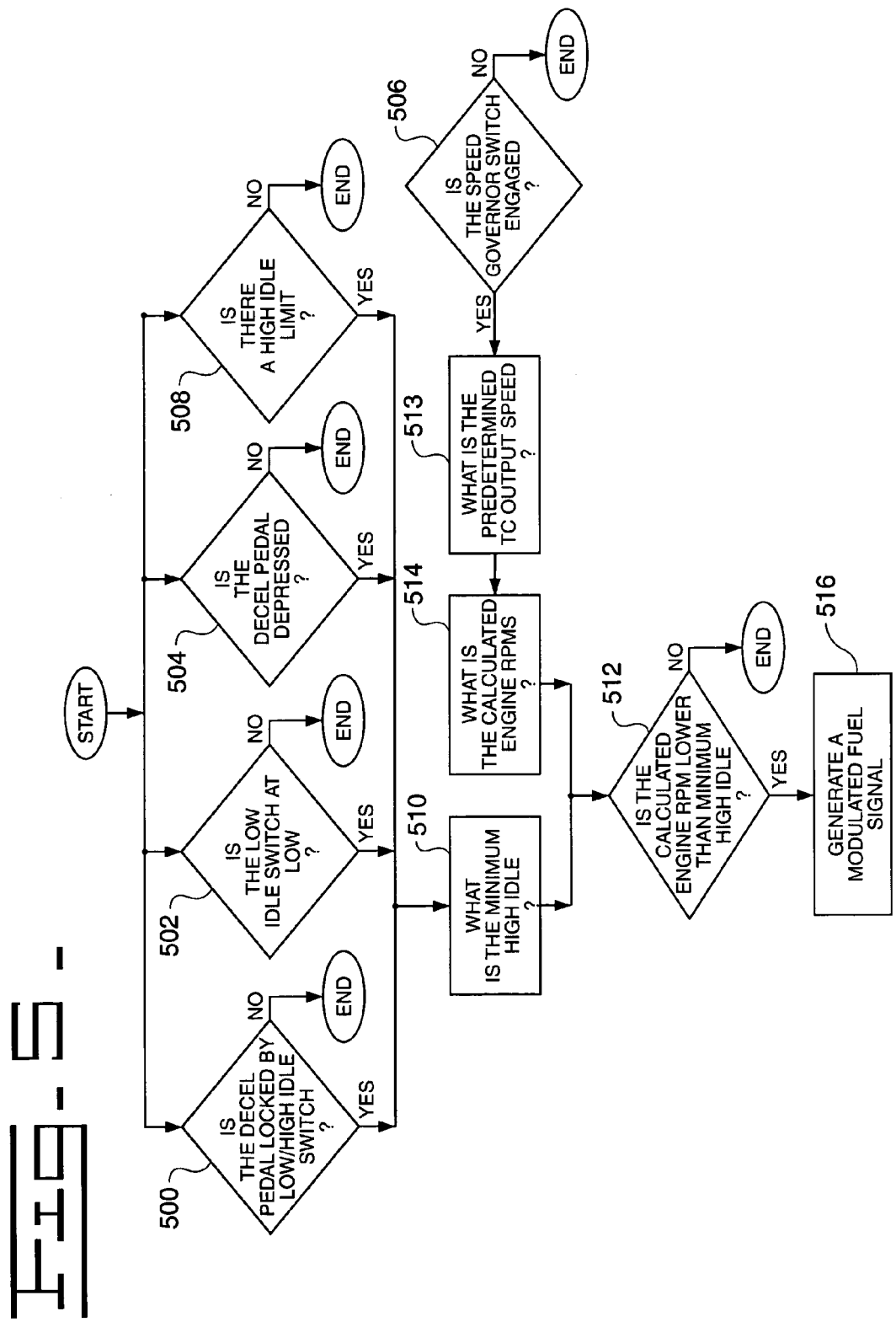

METHOD FOR CONTROLLING THE GROUND SPEED OF A WORK MACHINE

TECHNICAL FIELD

This invention relates to the field of work machine speed control, and, more particularly, to a strategy for controlling the maximum ground speed of the work machine using governing techniques.

BACKGROUND

Present work machines, such as track type tractors, may utilize a torque converter to allow the engine to spin somewhat independently of the transmission. Typically, the torque converter acts as a fluid coupler between the engine and the transmission, which transfers torque from the engine through the transmission and eventually to the ground. Because of the natural performance of torque converters, maximum ground speed can't be controlled even if the engine speed were controlled to be constant. This results in the machine speeding up even though the load is decreasing. The problem with traditional engine control is that even though power is decreasing, higher and higher speed ratios are encountered, which cause ground speeds to increase.

Government agencies have put stringent regulations and requirements on the amount of noise that a work machine can emit. Work machines, such as tracked machines are dominated by track noise; therefore, reducing the ground speed is advantageous for reducing noise. Traditionally, this was accomplished by reducing the high idle of the machine. However, this strategy is disadvantaged by the loss in productivity under a range of high speed, high load.

Furthermore, work machines, such as track type tractors, often are equipped with a ripper. When the ripper is engaged in a ripping operation, maintaining a constant speed is difficult because of the fluctuation in loads. The ground speed of the machine will vary based on the constant revolution per minute (RPM) of the engine and the fluctuating load.

One such work machine is disclosed in U.S. Pat. No. 6,240,356 to Robert A. Lapke on May 29, 2001. Lapke discloses a speed control system to maintain the ground speed of the work machine below a pre-determined maximum ground speed limit based on the angle of inclination of the operating terrain.

The present invention is directed to overcoming one or more of the problems set forth above.

SUMMARY OF THE INVENTION

A method of maintaining a constant ground speed of a work machine having an engine, powertrain, and at least one electronic control module (ECM) is disclosed. The method included sensing a parameter indicative of the ground speed of the work machine and responsively producing a signal indicative of the actual ground speed, providing a predetermined maximum ground speed of the work machine, receiving the signal indicative of the actual ground speed and the predetermined maximum ground speed of the work machine by the ECM, applying an algorithm to determine the desirable RPM of the engine of the work machine, and modulating the engine RPMs to the desirable engine RPMs to maintain a constant ground speed of the work machine.

A method of maintaining a constant ground speed of a work machine having an engine, powertrain, and at least one electronic control module (ECM) is disclosed. The method includes sensing the torque converter output speed and producing a torque converter output signal indicative of the torque converter output speed, sensing the engine output speed and producing a engine output signal indicative of the engine output speed, receiving the torque converter output signal and the engine output signal and producing a torque converter speed ratio by the ECM, providing a predetermined torque converter output speed indicative of the maximum ground speed of the work machine, and determining a desirable engine RPM in response to the torque converter speed ratio and the predetermined torque converter output speed that is indicative of the maximum ground speed of the work machine.

A method of maintaining a constant ground speed of a work machine having an engine, powertrain, and at least one electronic control module (ECM). The method includes sensing a parameter indicative of the ground speed of the work machine and responsively producing a signal indicative of the actual ground speed, providing a predetermined maximum ground speed of the work machine, receiving the signal indicative of the actual ground speed and the predetermined maximum ground speed of the work machine by the at least one ECM, and modulating the fuel to the engine to maintain a constant ground speed of the work machine.

BRIEF DESCRIPTION OF THE DRAWINGS

FIG. 5 is a flowchart of an algorithm for controlling the RPMs of the engine.

DETAILED DESCRIPTION

Figure 1:
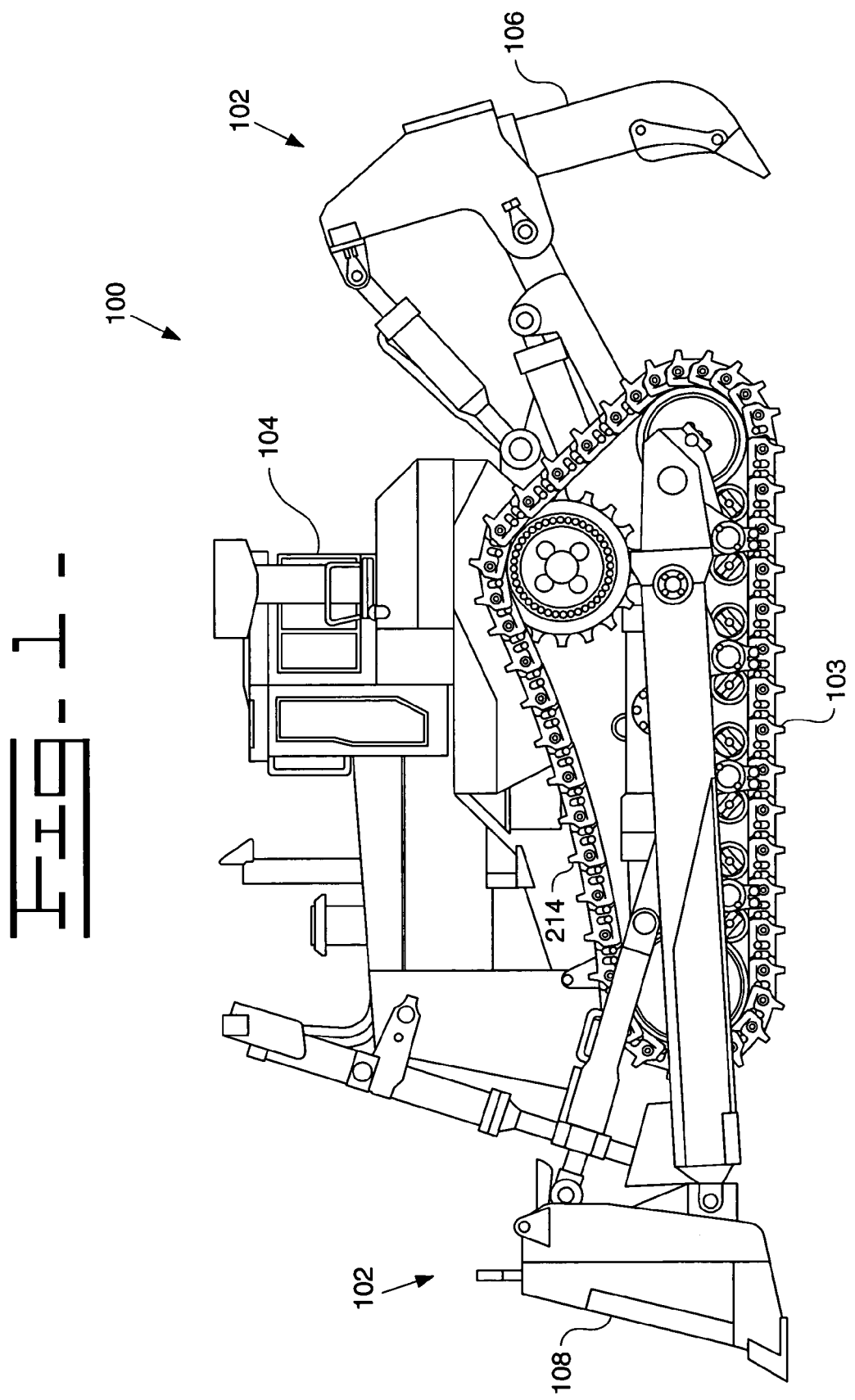
FIG. 1 is a drawing is an representation of a work machine.

FIG. 1 depicts a work machine 100, shown as a track type machine, equipped with work implements 102 and capable of performing various production operations, such as ripping, grading, and moving material. The work machine 100 includes an operator's cab 104 wherein an operator is position to operate the work machine 100. The work implements 102 are shown as being a ripper 106 and dozing blade 108, however, it should be understood that carry dozer blades, buckets, forks, or any work implements 102 that is used in a mobile operation could be used. The work machine 100 includes a pair of tracks 103 that engage the ground and is capable of operating in forward and reverse on level surfaces and slopes not exceeding the recommended slope angle of the work machine 100. The features disclosed herein may find application in any machine 100 that performs mobile production operations, along with vehicles that are non-production type machines 100 but mobile.

Figure 2:
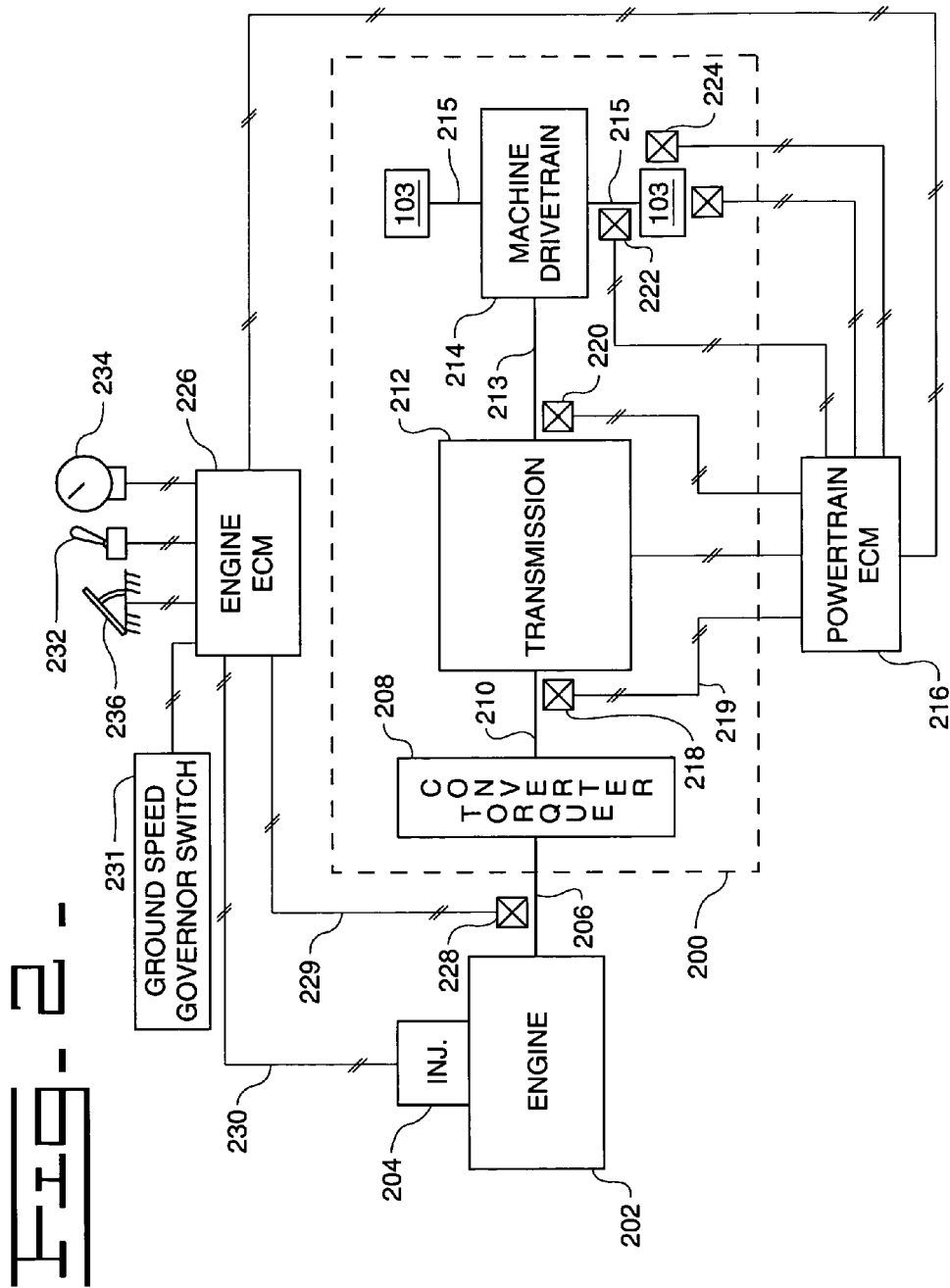
FIG. 2 is a diagram of an embodiment of a powertrain and engine of a work machine.

FIG. 2 shows a diagram of powertrain 200 and engine 202 of the work machine 100. The engine 202 in the embodiment is an internal combustion engine. The engine 202 may include a fuel supply system 204 used to control the amount of fuel delivered to the engine 202. The engine 202, having a engine output shaft 206 connected to a hydrodynamic torque converter 208, is capable of providing a variable output speed, measured in revolutions per minute (RPM), and torque, measured in ft*lbs to the torque converter. The torque converter 208 includes a torque converter output shaft 210 connected to a multi-speed transmission 212 and capable of rotating at a variable speed and delivering torque to the transmission 212. The transmission 212 includes a transmission output shaft 213 connected to the work machine's 100 drivetrain 214. The drivetrain 214 in the present invention is the final drive axle 215 that rotates the tracks 103 of the work machine 100, but is not limited to being connected to an axle that drives a pair of wheels.

A powertrain electronic controller module (PECM) 216 is provided to control the operation of the powertrain 200. The PECM 216 may include one or more algorithms to control the operation of the powertrain 200. The PECM 216 includes a microprocessor, which is meant to include microcomputers, microprocessors, integrated circuits and the like capable of being programmed. A torque converter output shaft sensor 218 connected to the PECM 216 produces a torque converter output signal 219 indicative of the rotational speed of the torque converter output shaft 210, which is proportional to the ground speed of the machine 100. Alternatively, any one of a plurality of sensors may be connected to the PECM 216, which may include but not limited to a transmission output sensor 220 for measuring the rotational output speed of the transmission output shaft 213, an axle speed sensor 222 for measuring the rotational speed of the axle 215, and a ground speed sensor 224 for measuring the actual speed of the machine 100 or any like sensor capable of producing a signal that is proportional to the ground speed of the machine 100.

An engine electronic controller module (EECM) 226 is provided to control the operation of the engine 202. The EECM 226 may include one or more algorithms to control the operation of the engine 202. The EECM 226 includes a microprocessor, which is meant to include microcomputers, microprocessors, integrated circuits and the like capable of being programmed. The EECM 226 is connected to the fuel supply system 204 for controlling and modulating the amount to fuel being delivered to the engine 202. An engine output speed sensor 228 connected to the EECM 226 produces an engine output speed signal 229 indicative of the rotational speed of the engine output shaft 206.

The EECM 226 is capable of receiving the engine output speed signal 229 and the torque converter output speed signal 219 from the PECM 216 and calculating a torque converter speed ratio, which is torque converter output speed divided by the engine output speed. Furthermore, the EECM 226 is capable of storing various data, such as a table of predetermined torque converter output speeds, which are indicative of various ground speeds of the machine 100. The EECM 226 includes an algorithm capable of calculating desirable engine RPMs and delivering a modulated fuel signal to the fuel supply system 204 for controlling a constant speed of the work machine 100, hereinafter this algorithm is known as the "ground speed governor". For example, predetermined torque converter output speed divided by the torque converter speed ratio may produce an engine RPM that is different than the current RPM of the engine 202. The EECM 226 would send a modulating fuel signal 230 to the fuel supply system 204 to modulate the amount of fuel being delivered to the engine 202, as a result reducing or increasing the engine RPMs to maintain a constant ground speed of the work machine 100. However, it would be obvious to one verse in the art that ground speed is a product of track speed and slippage and that any slippage would reduce ground speed but maintain a constant track speed in the present invention. Alternatively, other calculations may be made using any one of the aforementioned sensors to produce desired engine RPMs. The ground speed governor is controlled by ground speed governor switch 231 located in the operator's cab 104. The switch is connected to the EECM 226 for turning the ground speed governor on and off. The switch may be a push button, toggle, foot pedal, key, touch pad, dial, or lever type of switch.

The predetermined torque converter output speed used in the calculation for determining engine RPMs may be hard-coded into the EECM 226 program logic or be variable. The variable predetermined torque converter output speed may be prescribed from on-board the machine or remotely. The operator may use an input device (not shown) located in the operator's cab 104 to change the predetermined torque converter output speed. The input device may be a foot pedal, toggle switch, keyboard, touchpad, dial or the like. Authorized personnel may change the hard-coded predetermined torque converter output speed through a direct link to the EECM 226. The predetermined torque converter output speed may be changed remotely through satellites, local area network (LAN) and wide area networks (WAN) networks, personal data assistants (PDAs) or other means for remotely controlling the EECM 226 program logic. By changing the predetermined torque converter output speed, one well verse in the art can control the ground speed of the work machine 100 as it relates to various machine operations or operating parameters, such as in a ripping operation, operating on a slope, retarding the engine 202, controlling the maximum speed of the work machine 100, or controlling overspeeding of the engine 202.

For exemplary purposes, the work machine 100 may be capable of limiting the maximum RPMs of the engine 202 through a plurality of variable parameters. One such parameter utilizes an asynchronous governor to limit the maximum RPMs to approximately 2100 RPM or any other predetermined RPM. This may be hard-coded into the logic of the EECM 226 and can only be changed by methods known in the art to change program logic. Another parameter may use a high/low idle input switch 232 to toggle between an upper and lower engine high idle. For example, when on the low idle setting the high idle may be 800 RPMs but when switched to the high idle setting the high idle switches to the maximum 2100 RPMs. Yet another parameter may use a deceleration pedal 236 for the operator to depress. For example, by depressing the pedal 236 throughout its range of motion, produces a proportional decrease in engine high idle RPMs. Another parameter locks the deceleration pedal 236 by depressing the deceleration pedal 236 to the desired engine high idle and switching the high/low idle switch 232 to the high idle, thus locking the desired engine high idle. Once the high/low idle input switch 232 is toggled to the low idle, it unlocks and engine high idle is resumed to a default high idle.

In addition, the EECM 226 may be provided with traditional retarding capabilities when the work machine 100 is in a downhill slope operation or external forces are causing negative work machine 100 output power. These traditional retarding capabilities are not part of the present invention, and will only be discussed briefly. In traditional retarding, as the work machine 100 experiences negative machine output power, the engine 202 continues to run at a equal or faster RPM while reducing the fuel to gradually to 0 when external forces are sufficient to overcome such things as internal friction and pump losses to maintain a constant speed.

Alternatively, the use of one electronic control module (ECM) could be used to control both the powertrain 200 and engine 202. The ECM may receive a plurality of signals including but not limited to the engine output speed signal 229, the torque converter output speed signal 219, the transmission output sensor 220, the axle speed sensor 222, and the ground speed sensor 224 or any like sensor capable of producing a signal that is proportional to the ground speed of the machine 100 and the like. The ECM may be capable of calculating the torque converter speed ratios and engine RPMs. Furthermore, the ECM may control the fuel supply system 204.

Figure 3:
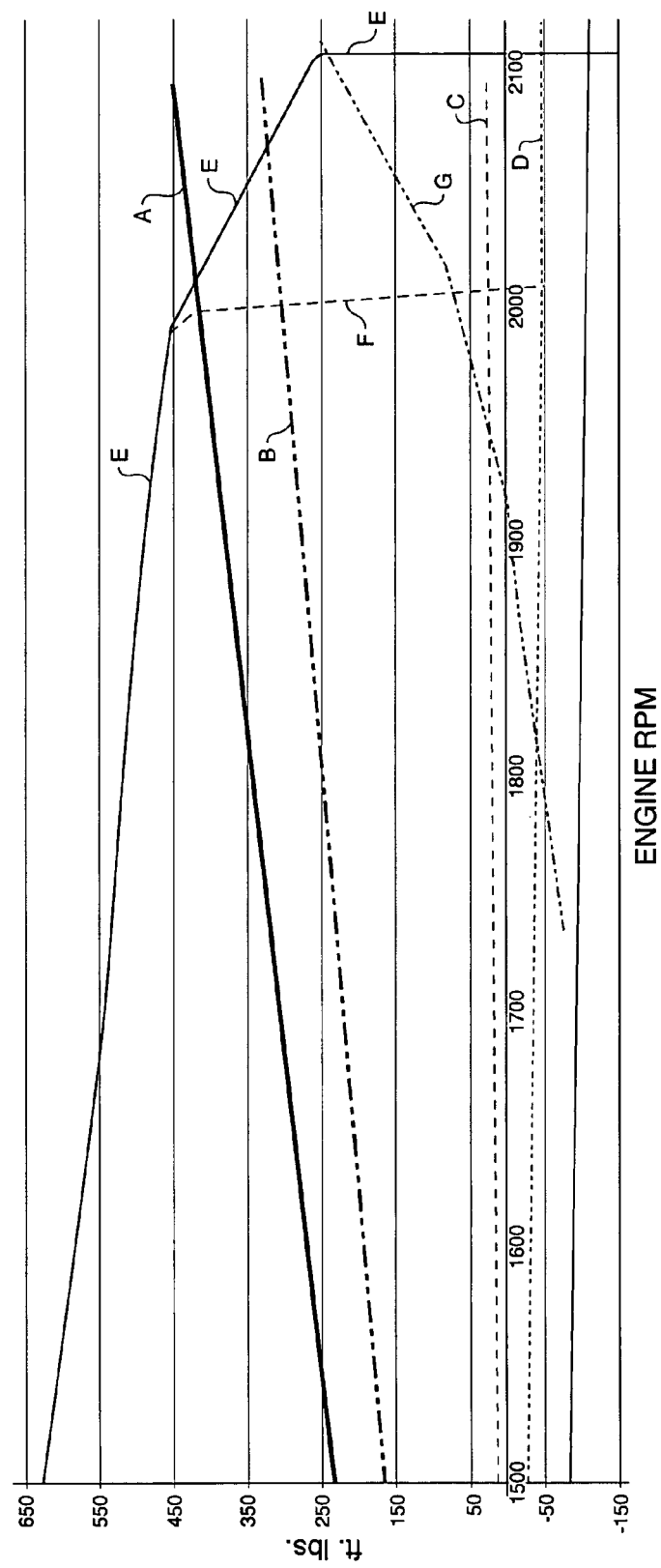
FIG. 3 is a graphical representation of engine RPM versus torque curves for an embodiment of the present invention.

FIG. 3 depicts a graphical representation of engine RPM versus torque curves for the work machine 100. The X-axis is indicative of the engine RPMs and the Y-axis is indicative of the torque output power of the torque converter 208 and engine 202. Lines A, B, C, and D are representative of constant torque converter speed ratios. For exemplary purposes, line A is a speed ratio of 0.95, line B is a speed ratio of 1.0, line C is a speed ratio of 1.1, and line D is a speed ratio of 1.2. Line E represents a traditional engine lug curve for the traditional 2100 RPM engine 202. Each intersection of the constant speed ratios, lines A, B, C, and D, and engine 202 lug curve, line E, represents an operating point. Because the engine 202 lug curve, line E, and speed ratios, lines A, B, C, and D, shown are exemplary and there are an infinite number of curves that can be produced, there are an infinite number of operating points. Line F represents a reduced high idle engine lug curve, used for ground speed control, with the high idle of 2000 RPM. Note the differences in operating points between the reduced high idle engine 202 and the traditional 2100 RPM engine 202. The plot shows for any of the four speed ratios, lines A, B, C, and D, illustrated the traditional 2100 RPM engine 202 would yield both an increase in speed and power versus the reduced high idle 2000 RPM engine 202. Line G represents the present invention lug curve indicative of the constant ground speed of the work machine 100. Note the present invention lug curve, line G, follows the traditional engine lug curve, line E, up to a given torque converter output speed and then begins to reduce the engine RPMs, thus, reducing speed and power.

Figure 4:
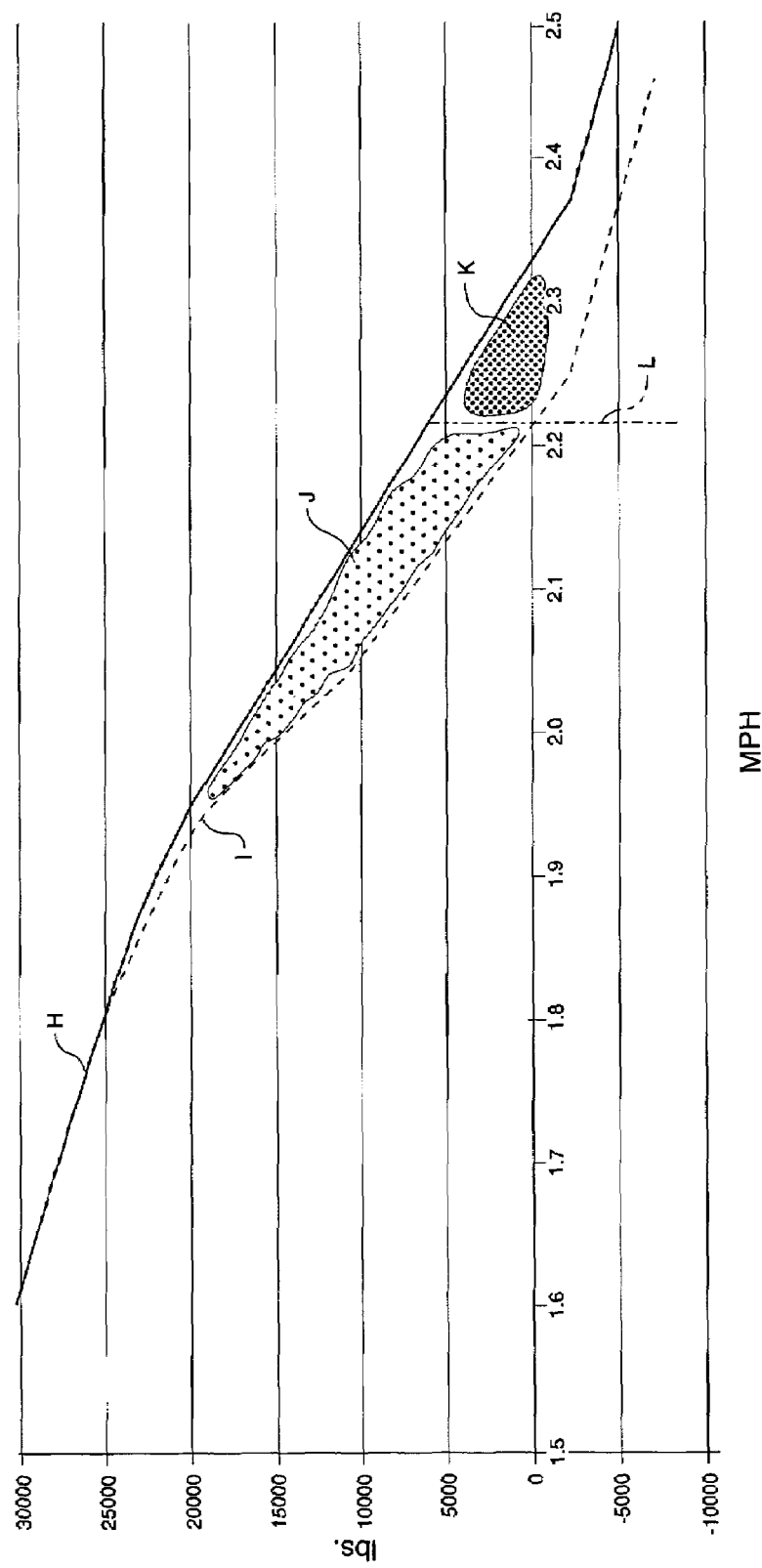
FIG. 4 is a graphical representation of work vehicle's MPH versus drawbar load for an embodiment of the present invention.

FIG. 4 depicts a graphical representation of work machine's 100 MPH versus drawbar pull of the work machine 100. The X-axis represents the ground speed of the work machine 100, measured in miles per hour (MPH). The Y-axis represents the drawbar pull of the work machine 100, measured in pounds (lbs). Line H represents the drawbar pull as it relates to ground speed of the traditional 2100 RPM high idle machine 100. Line 1 represents the drawbar pull as it relates to ground speed of the reduced high idle 2000 RPM high idle machine 100. Note that the combination of areas J and K are considered lost production because of the lower drawbar pull at a given ground speed as a result of the reduced high idle engine 202. Line L represents the present invention of the ground speed governor of controlling the maximum ground speed through controlling the engine RPMs. Note that the curve follows line H up to a predetermined MPH and then remains constant. By following this curve area J productivity is regained over the reduced high idle engine 202.

Although the description and related drawings use specified scales for graph axis', lines with specified slopes, and specific engine RPMs it should be obvious to one well verse in the art that the scales, slopes, and RPMs should be determined based on the parameters of the work machine 100 being used.

FIG. 5 is a flowchart of the ground speed governor algorithm of the present invention. The algorithm is run at every clock cycle of the machine 100, but could be run at any continuous intervals. Control starts in decision blocks 500, 502, 504, and 508. Decision block 500 determines if the deceleration pedal 236 is in a locked setting. If yes, control passes to block 510.

Decision block 502 determines if the low setting on the high/low idle input switch 232 is selected. If yes, control passes to block 510.

Decision block 504 determines if the deceleration pedal 236 has been depressed. If yes, control passes to block 510.

Decision block 508 determines if there is the engine high idle programmed into the logic of the EECM 226. If yes, control passes to block 510.

Block 510 determines the lowest engine high idle out of decision blocks 500, 502, 504, and 508. Control then passes to decision block 512.

Simultaneously, block 506 determines if the ground speed governor algorithm is engaged. If yes, control passes to block 513 where it is determines the predetermined torque converter output speed. Control then passes to block 514 where the RPMs are calculated based on the calculation of predetermined torque converter output speed divided by the torque converter speed ratio. Control then passes to decision block 512.

Decision block 515 determines if the calculated RPMs are lower than the RPMs from decision blocks 500-508. If yes, control passes to 514 where the EECM 226 adjust the RPM of the engine 202.

INDUSTRIAL APPLICABILITY

The work machine 100 is equipped with work implements 102 and capable of performing various production operations, such as ripping, grading, and moving material. The work machine 100 can operate in forward and reverse at various slope angles.

It may be desired to limit the speed of the work machine 100 to a maximum MPH, whether because of the regulations of government agencies for sound emitted by the work machine 100 or the desire of the operator to limit maximum speed for production operations, such as for a ripping operation. When this is desired, the EECM 226 can control the amount of fuel being sent to the engine 202 to maintain the predetermined constant MPH. To accomplish this the EECM 226 uses the ground speed governor algorithm to calculate the engine RPMs based on a calculation of predetermined torque converter output speed divided by the speed ratio and comparing the result to the minimum engine high idle from the machine parameters. By utilizing the algorithm to determine the RPMs of the engine 202 to maintain a constant speed, productivity is increased over the tradition derated engine 202 because the maximum RPMs are utilized, indicated by lug, line G on FIG. 3, and drawbar pull, line L on FIG. 4.

Alternatively, it may be desired only to assist in retarding the engine 202 when working on slopes. To accomplish this the predetermined torque converter output speed may be set so that the maximum speed of the work machine 100 can be achieved in self propulsion, but capable of assisting traditional retarding means. Because the ground speed governor can control the constant speed of the work machine 100, when the machine 100 experiences negative output power, either through gravity or other external forces, the fuel to the engine 202 will be reduced faster than the traditional retarding means, not allowing the higher engine speeds as with the traditional retarding capabilities. However, the maximum retarding capability of the machine remains unchanged.

What is claimed is:

1. A method of maintaining a constant ground speed of a work machine having an engine, powertrain, and at least one electronic control module (ECM), the method comprising;
   sensing a parameter indicative of the ground speed of the work machine and responsively producing a signal indicative of the actual ground speed;
   providing a predetermined maximum ground speed of the work machine;
   receiving the signal indicative of the actual ground speed and the predetermined maximum ground speed of the work machine by the at least one ECM;
   determining a minimum high idle RPM of the work machine:
   applying an algorithm to determine desirable RPM of the engine of the work machine based on at least the signal indicative of the actual ground speed, the minimum high idle RPM and the predetermined maximum ground speed of the work machine; and
   modulating engine RPM to the desirable engine RPM to maintain constant ground speed of the work machine.

2. The method of claim 1, wherein sensing the parameter indicative of ground speed includes sensing torque converter output speed.

3. The method of claim 1, wherein sensing the parameter indicative of ground speed includes sensing transmission output speed.

4. The method of claim 1, wherein sensing the parameter indicative of ground speed includes sensing axle speed.

5. The method of claim 1, wherein sensing the parameter indicative of ground speed includes sensing the ground speed of the work machine.

6. The method of claim 1, wherein applying the algorithm includes;
   calculating a RPM of the engine of the work machine using the parameter indicative of the ground speed of the work machine and the predetermined maximum ground speed of the work machine;
   determining lowest RPM value between the minimum high idle RPM and the calculated RPM of the engine; and
   generating a modulated fuel signal based on the lowest RPM value.

7. A method of maintaining a constant ground speed of a work machine having an engine, powertrain, and at least one electronic control module (ECM), the method comprising;
   sensing torque converter output speed and producing a torque converter output signal indicative of the torque converter output speed;
   sensing engine output speed and producing an engine output signal indicative of the engine output speed;
   receiving the torque converter output signal and the engine output signal and producing a torque converter speed ratio by the at least one ECM;
   providing a predetermined torque converter output speed indicative of the maximum ground speed of the work machine; and
   determining a desirable engine RPM in response to the torque converter speed ratio and the predetermined torque converter output speed that is indicative of the maximum ground speed of the work machine; and
   modulating engine RPM to the determined desirable engine RPM to maintain a constant ground speed of the work machine.

8. The method claim 7, wherein providing the predetermined torque converter output speed includes prescribing the predetermined torque output speed by at least one of on-board and remotely.

9. The method of claim 8, wherein determining a desirable engine RPM includes;
   determining a minimum high idle RPM of the work machine; calculating a RPM of the engine of the work machine using the predetermined torque converter output speed and the torque converter speed ratio;
   determining a lowest RPM value between the minimum high idle RPM and the calculated RPM of the engine; and
   generating a modulated fuel signal based on the lowest RPM value.

10. A method of maintaining a constant ground speed of a work machine having an engine, powertrain, and at least one electronic control module (ECM), the method comprising;
    sensing a parameter indicative of the ground speed of the work machine and responsively producing a signal indicative of the actual ground speed;
    providing a predetermined maximum ground speed of the work machine; receiving the signal indicative of the actual ground speed and the predetermined maximum ground speed of the work machine by the at least one ECM;
    determining a minimum high idle RPM of the work machine;
    modulating the fuel, based on the parameter indicative of the ground speed of the work machine, the minimum high idle RPM and the predetermined maximum ground speed of the work machine. to the engine to maintain a constant ground speed of the work machine.

* * * * *